(12) United States Patent
Keller et al.

(10) Patent No.: US 8,306,377 B2
(45) Date of Patent: Nov. 6, 2012

(54) LOOSE TUBE OPTICAL FIBER CABLE DESIGN AND METHOD FOR MAKING THE SAME

(75) Inventors: David Keller, Cary, NC (US); Jeff Rosenquist, Wendell, NC (US); Robert Pruitt, Four Oaks, NC (US); Allen L. Jones, Four Oaks, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/290,782

(22) Filed: Nov. 3, 2008

(65) Prior Publication Data

US 2009/0129734 A1    May 21, 2009

Related U.S. Application Data

(60) Provisional application No. 61/001,809, filed on Nov. 2, 2007.

(51) Int. Cl.
*G02B 6/44* (2006.01)

(52) U.S. Cl. .................................. 385/109; 385/100

(58) Field of Classification Search .................. None
See application file for complete search history.

(56) References Cited

U.S. PATENT DOCUMENTS

| | | | | |
|---|---|---|---|---|
| 4,232,935 | A * | 11/1980 | Rohner et al. | 385/111 |
| 5,377,290 | A * | 12/1994 | Ohta et al. | 385/100 |
| 5,684,904 | A * | 11/1997 | Bringuier et al. | 385/109 |
| 7,123,801 | B2 * | 10/2006 | Fitz | 385/105 |
| 7,630,605 | B2 * | 12/2009 | Bringuier et al. | 385/100 |
| 2002/0159727 | A1 * | 10/2002 | Okada et al. | 385/109 |
| 2004/0096166 | A1 * | 5/2004 | Rossi et al. | 385/100 |
| 2011/0135816 | A1 * | 6/2011 | Burns et al. | 427/163.2 |

FOREIGN PATENT DOCUMENTS

DE       4219607 C2 *    9/1995

* cited by examiner

*Primary Examiner* — M. Stahl
(74) *Attorney, Agent, or Firm* — Sofer & Haroun, LLP

(57) ABSTRACT

A loose tube fiber optic cable having at least one optical fiber, a loose tube surrounding the fiber, with the tube having an irregular inner surface. A water swellable powder is provided around the fiber and inside the tube, where the particles of the water swellable powder rest in the irregular inner surface of the tube.

8 Claims, 3 Drawing Sheets

LOOSE TUBE OPTICAL FIBER CABLE DESIGN AND METHOD FOR MAKING THE SAME

RELATED APPLICATION

This application claims the benefit of priority from U.S. Provisional Patent Application No. 61/001,809, filed on Nov. 2, 2007, the entirety of which is incorporated by reference.

FIELD OF THE INVENTION

This application relates to fiber optic cables. More particularly, the present application relates to improvements in loose tube fiber construction.

BACKGROUND

Fiber optics are typically constructed as either basic UV coated fibers (typically 250 micron diameter) or tight buffer coated fiber (typically 900 micron outer diameter). Tight buffer optical fibers are used in many cases where a stand alone optical fiber is desired. However, when a UV coated fiber is desired they are typically loosely bundled into a common tube for installation and handling. This "loose tube" arrangement typically has 12 UV coated fiber optic elements surrounded by a loosely fitting extruded polymer tube. More or less UV coated fiber optic elements may be used as well, but twelve fibers per tube is a common configuration.

In order to meet construction requirements, many additional features and elements may be added to the tubes. For example, to prevent water ingress, gels were commonly used, applied to the fibers prior to the tube extrusion to prevent water from entering the tube in the case that the tube is breached due to environmental conditions. However such gels are difficult and expensive to use during cable creation, and also difficult to use during applications where the gel needs to be cleared away before splicing operations. Additionally, although the fibers are technically loose with the tube, the gels effectively couple the fibers to the tube wall, and thus pressures and tensions applied to the tubes during installation may be inadvertently carried into the fibers themselves, with gel further acting to lock such strain into the fibers.

To overcome this in the prior art certain loose tube arrangements have been fabricated to be gel-free or "dry." In one arrangement, water swellable powders are used as water blocking agents. However, as more water swellable powders are added within the tube, this can cause micro-bending at the locations where the powder particles are wedged between the inner surface of the tube and fibers. See prior art FIG. 1.

Moreover, certain polymers used to form the tubes, such as PVDF (Polyvinylidene Fluoride—used for its flame and smoke effectiveness), exhibit increased variability in their post extrusion shrinkage and can cause the length differential between the tubes and the fibers to be excessive, a condition that is detrimental or even fatal to the cable's effectiveness. This condition may be exacerbated in dry tubes that lack the gel compound which would have tended to moderate such excessive post extrusion shrinkage.

OBJECTS AND SUMMARY

The present invention looks to overcome the drawbacks associated with the prior art and to provide an improved loose tube fiber optic cable construction and method for making the same, wherein by altering the draw down ratio and draw ratio balance, the PVDF is provided with better post extrusion shrinkage properties. Furthermore, the resultant inner wall of the extruded loose tube is provided with an irregular matte surface that has creases or indentations running along the length of the tube so that particles of the water swellable powder may embed within the irregularities so as to avoid microbending of the UV coated fibers within the tube.

To this end, the present invention provides for a loose tube fiber optic cable with at least one optical fiber and a loose tube surrounding the fiber where the tube has an irregular inner surface. Water swellable powder is provided around the fiber and inside the tube, where the particles of water swellable powder rest in the irregular inner surface of the tube.

Furthermore, the present invention provides for a method of producing a loose tube fiber optic cable including arranging at least one optical fiber, applying water swellable powder to the fiber, and extruding a loose tube over the fiber. The extrusion results in the tube having an irregular inner surface, where the water swellable powder is collected in the irregular inner surface of the tube, at least in part away from the fiber.

BRIEF DESCRIPTION OF THE DRAWINGS

The present invention can be best understood through the following description and accompanying drawings, wherein.

DETAILED DESCRIPTION

Figure 1:
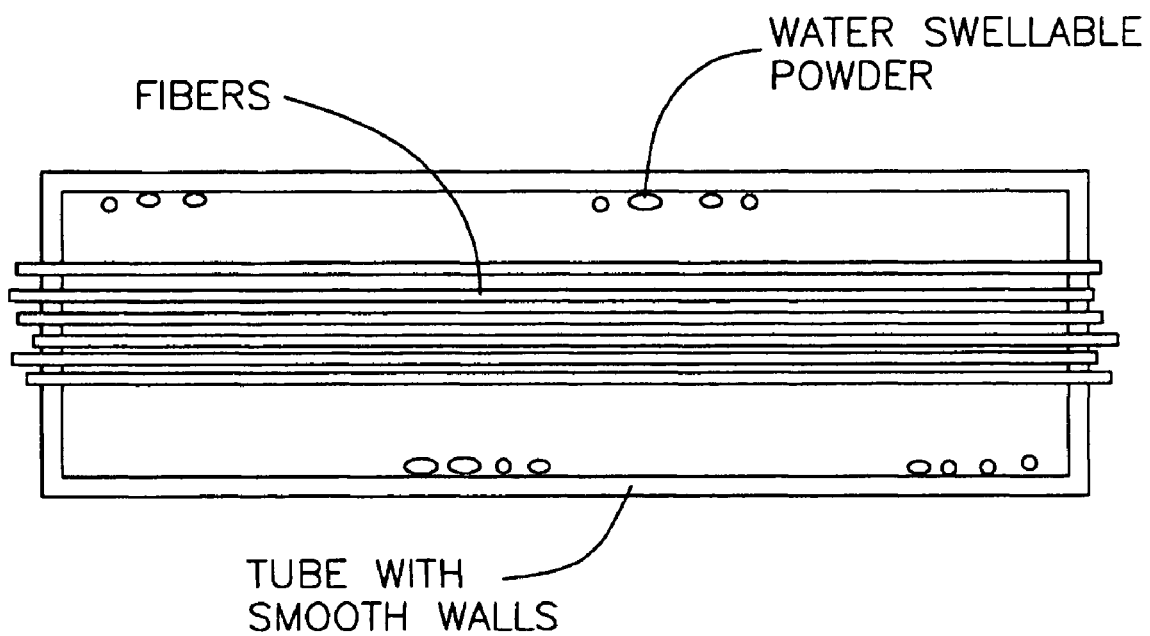
FIG. 1 is a prior art loose tube fiber optic cable with water swellable powder and smooth inner surfaces of the tube.
Figure 2:
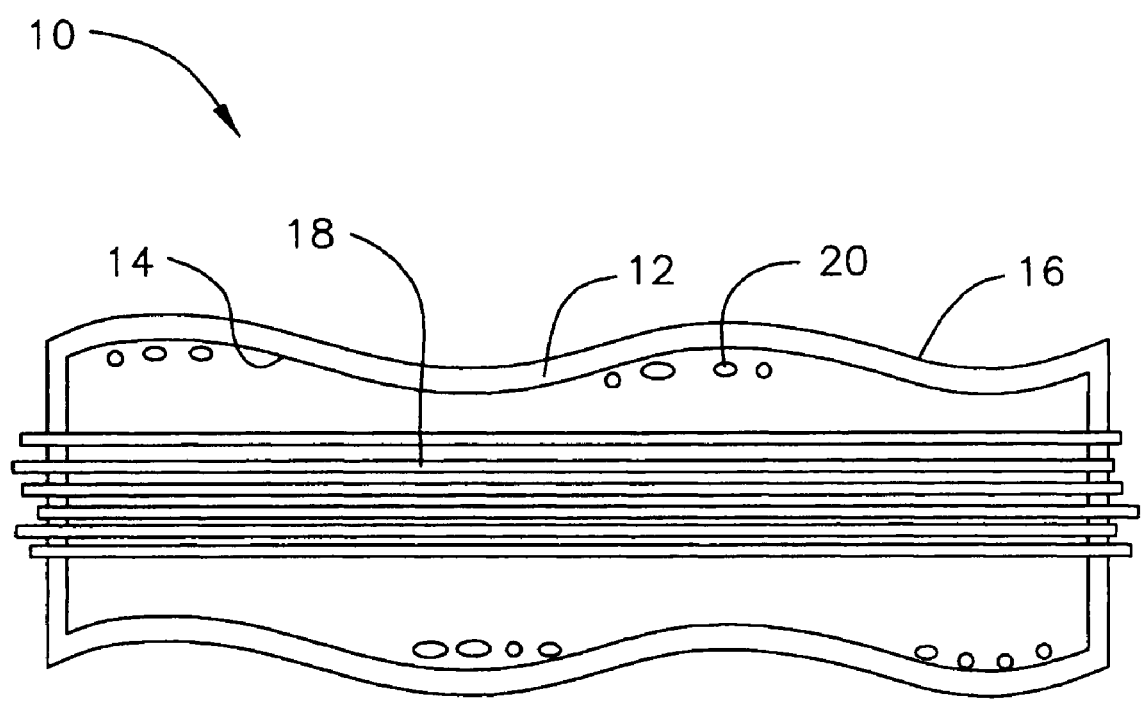
FIG. 2 is a loose tube fiber optic cable with water swellable powder and an irregular inner surfaces of the tube in accordance with one embodiment.

In accordance with one embodiment of the present invention, as illustrated in FIG. 2, loose tube fiber optic cable 10 is shown. Cable 10 includes a jacket or tube 12 having an inner surface 14 and an outer surface 16. Within tube 12, a number of UV coated fiber optic elements 18 are arranged. Around fiber optic elements 18, particles of water swellable powder 20 are distributed, against inner surface 14 of tube 12.

Tube 12 is preferably constructed of PVDF (Polyvinylidene Fluoride), however, the salient features of the present invention may be applicable for tubes 12 constructed of other similar polymers used in extrusion type loose tube fiber optic cable construction. For the purposes of illustration, PVDF is used through out the application to illustrate the features of the invention.

In one embodiment of the present invention, the draw down ratio (DDR) and the draw balance ratio (DRB) are reduced relative to typical extrusions of PVDF in order to obtain better post extrusion shrinkage characteristics as well as to produce an irregularly shaped inner surface 14 of tube 12.

For example draw down ratios of 7-10 to 1 and a draw ratio balance ratios of 0.98 to 1.02 are set for PVDF extrusions for loose tube fiber optic cables. In one specific prior art example of the process, a DDR of 8.7 is used. Such an arrangement generates a smooth inner and outer surface for the tubes. Also, the resultant area reduction from the larger draw down ratio causes the extrusion forces, such as post extrusion molecular non-relaxed orientations, to be temporarily trapped in the resultant tube, causing the tube to exhibit elevated levels of post extrusion shrinkage, particularly in dry tube arrangements. During extrusion at higher draw down ratios, molecular orientation is left unfinished or in imbalance, which is supposed to work its way to a more balanced state by slowly shifting over time and temperature (reorientation). Because the melt is quenched in these higher draw down extrusions of PVDF for example, before the orientation is relaxed or complete, stresses are left on the molecular orientation of the polymers.

Figure 3:
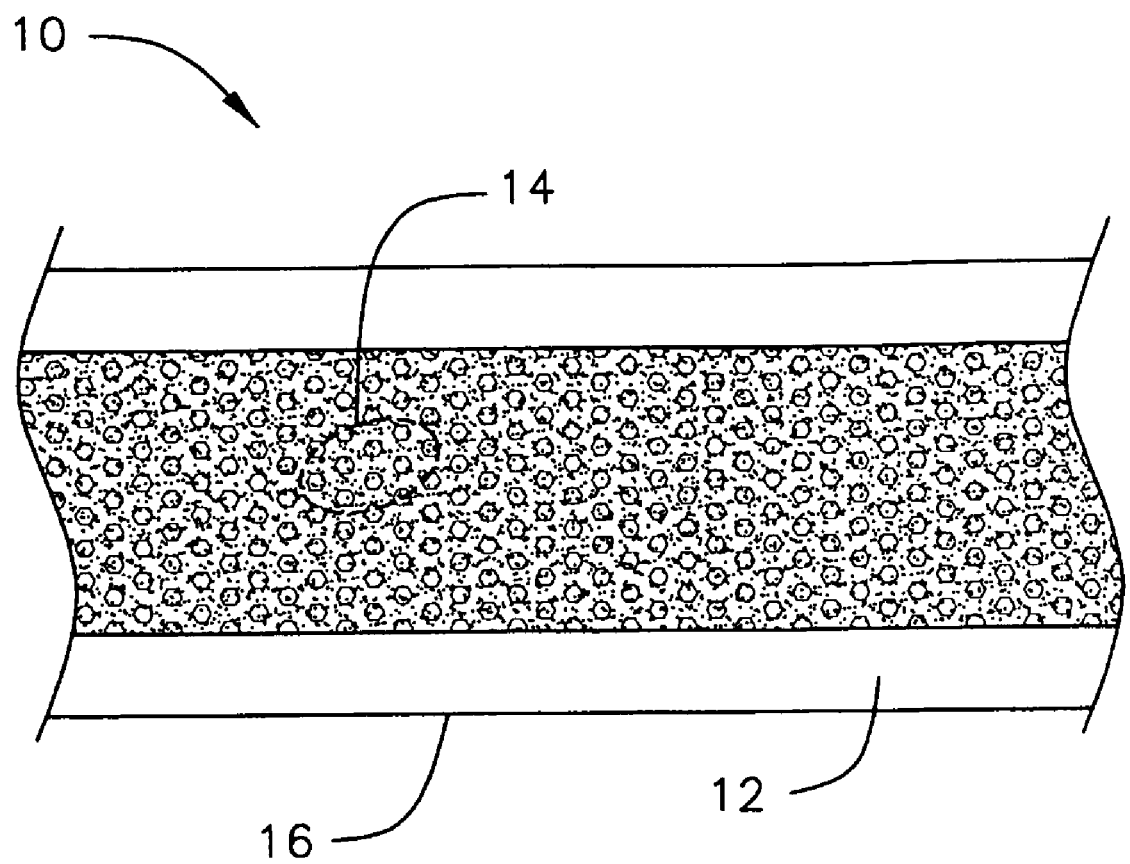
FIG. 3 is a close up image of the irregular inner surfaces of the tube, in accordance with one embodiment.

According to one embodiment of the present invention, the draw down ratio is advantageously reduced to substantially to the range of 3.0 to 1 to 2.9 to 1 and the draw ratio balance is reduced to 1.017. Accordingly, the resulting tube 12 exhibits a roughened or irregular inner and outer surface 14 and 16. FIG. 3 shows a close up image of inner surface 14 of tube 12 of the surface.

By reducing the draw down ratio towards the a preferred 1 to 1 ratio, the significantly reduced draw down ratio has at least two effects.

First, the reduced draw down ratio results in the polymer exit speed occurring at a much faster rate. For example a draw down ratio of 2.9 to 1 in on embodiment of the present invention, versus a prior art draw down ratio of about 8.7 to 1 would have a polymer exit speed (from the extrusion head on to the line) occurring at a speed of nearly three times faster. This higher speed, lower ratio draw down, results in the roughened or irregular inner surface 14 of tube 12. In one embodiment of the present invention, the lower DDR and higher line speeds are performed without adjustments to the length of the extrusion tube in the crosshead of the extruder.

Additionally, by lowering the drawn down ratio to 2.9 to 1 to 3.0 to 1, closer to a preferred 1 to 1 ratio, the PVDF has a lesser tendency to shrink, post extrusion, because the lower ratio allows for a more relaxed molecular orientation during extrusion, as discussed above.

Furthermore, as shown in FIG. 2, the irregular inner surface 14 of tube 12 provides "pockets" or indentations for water swellable powder particles 18 to rest, preventing excessive contact and bending of the optical fibers 18, consequently reducing the incidences of microbending.

In another embodiment of the invention, the extrusion of tube 14 may be performed using a reduced DDR in the range of 3.0 to 1 and 2.9 to 1, and preferably at 2.966 to 1, and reduced process temperatures or low melt temperatures, having a extrusion temperature progression of substantially 175° C., 185° C., 190° C., 195° C., 195° C., 195° C., 195° C. as opposed to prior art arrangements which in similar conditions would occur at 175° C., 185° C., 195° C., 200° C., 210° C., 210° C., 210° C. and with a controlled high melt fracture (ie. increased plastic speed from 8.7 to 1 DDR to 2.94 to 1 DDR) resulting in an irregular (or matte appearance) surface texture. The temperature progressions are based on the heater elements in the screw (four heaters), clamp adapter and crosshead of the extrusion line)

This matte surface condition for tube 12, while increasing the surface area of inner surface 12 of tube 14, decreases the contact surface area available to fiber 18 causing a unique reduction of the friction differential in such dry hollow tube arrangement not found in the prior art, allowing easier control of the fiber insertion and excess length during manufacture of the cable.

Another prior art drawback discussed above in the background is that excessive contraction of highly crystalline polymers such as PVDF causes too much fiber excess length in "hollow" or dry tube arrangements because there is no gel present to inhibit natural contraction on cooling. This results in higher attenuation loss due to macrobending (during bending at installation) accompanied by the related microbending (caused by contact of the fiber with water swellable powder and the tube wall). The present invention, using the reduced DDR/DRB combination, results in a more laminar flow during extrusion, greatly reduces post extrusion shrinkage of the PVDF from 0.1% (typical prior art) to as low as 0.005%. Therefore, the length differential of the fiber 18 to tube 12 is kept to within 0.005 to 0.05%.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A loose tube fiber optic cable, said cable comprising:
   a plurality of UV coated optical fiber elements;
   a loose tube surrounding said plurality of coated optical fiber elements, said tube having an irregular inner surface said irregular inner surface having indentations running, longitudinally along the length of said loose tube; and
   water swellable powder around said plurality of coated optical fiber elements and inside said tube, wherein a substantial portion of the particles of said water swellable powder rest in said irregular inner surface of said tube so that said water swellable powder is at least partially held away from said coated optical fiber elements, sufficient to prevent microbending of said coated optical fiber elements.

2. The loose tube fiber optic cable as claimed in claim 1, wherein said loose tube is constructed of PVDF.

3. The loose tube fiber optic cable as claimed in claim 2, wherein said loose tube is constructed of PVDF extruded at a draw down ratio of substantially 3.0 to 1 to 2.9 to 1.

4. A method of producing a loose tube fiber optic cable, said method comprising the steps of:
   arranging a plurality of coated optical fiber elements;
   applying water swellable powder to said plurality of optical fiber elements; and
   extruding a loose tube over said at least one coated optical fiber element, said extrusion resulting in said tube having an irregular inner surface, wherein a substantial portion of said water swellable powder is collected in said irregular inner surface of said tube, at least in part away from said plurality of coated optical fibers elements, sufficient to prevent microbending of said coated optical fiber elements.

5. The method as claimed in claim 4, wherein said extrusion of said tube is conducted at a draw down ratio of substantially 3.0 to 1 to 2.9 to 1.

6. The method as claimed in claim 4, wherein said extrusion of said tube is conducted at a draw ratio balance of substantially 1.02-1.01 to 1.

7. A loose tube fiber optic cable constructed by extrusion, said cable comprising:
   a plurality of coated optical fiber elements;
   a loose tube extruded around said plurality of coated optical fiber elements, said tube having an irregular inner surface imparted by said extrusion being carried out at a draw down ratio of substantially 3.0 to 1 to 2.9 to 1 and at a draw ratio balance of substantially 1.02-1.01 to 1; and
   water swellable powder applied around said plurality of optical fiber elements and inside said tube, wherein the particles of said water swellable powder rests in said irregular inner surface of said tube so that said water swellable powder is at least partially held away from said coated optical fiber elements.

8. The loose tube fiber optic cable as claimed in claim 1, wherein said indentations running longitudinally along the length of said loose tube are formed during extrusion.

* * * * *